United States Patent [19]
Jones et al.

[11] Patent Number: 5,224,037
[45] Date of Patent: Jun. 29, 1993

[54] DESIGN OF SUPER-FAST THREE-DIMENSIONAL PROJECTION SYSTEM FOR POSITRON EMISSION TOMOGRAPHY

[75] Inventors: William F. Jones; Michael E. Casey, both of Knoxville; Larry G. Byars, Oak Ridge, all of Tenn.

[73] Assignee: CTI, Inc., Knoxville, Tenn.

[21] Appl. No.: 670,291

[22] Filed: Mar. 15, 1991

[51] Int. Cl.⁵ ............................................. G06F 15/00
[52] U.S. Cl. ............................ 364/413.19; 364/413.13
[58] Field of Search ...................... 364/413.19, 413.21, 364/413.22; 395/119, 124

[56] References Cited

U.S. PATENT DOCUMENTS

| | | |
|---|---|---|
| 4,415,807 | 11/1983 | Friauf et al. |
| 4,563,582 | 1/1986 | Mullani |
| 4,642,464 | 2/1987 | Mullani |
| 4,677,299 | 6/1987 | Wong |
| 4,710,876 | 12/1987 | Cline et al. |
| 4,729,098 | 3/1988 | Cline et al. |
| 4,733,083 | 3/1988 | Wong |
| 4,755,679 | 7/1988 | Wong |
| 4,864,140 | 9/1989 | Rogers et al. |
| 4,868,392 | 9/1989 | Wong |
| 4,879,652 | 11/1989 | Nowak ........................ 364/413.18 |
| 4,890,326 | 12/1989 | Euler |
| 5,008,822 | 4/1991 | Brunnett et al. ............... 364/413.19 |

Primary Examiner—Gail O. Hayes
Assistant Examiner—Ari M. Bai
Attorney, Agent, or Firm—Pitts & Brittian

[57] ABSTRACT

A 3-dimensional projection system (10) for the rapid back projection of multi-ring Positron Emission Tomography (PET) scan data composed of planes (44) of two-dimensional data defining individual Lines Of Response (LOR) (42) into a plurality of image voxels for three-dimensional display on a video screen. The projection system (10) of the preferred embodiment is a Very Large Scale Integration (VLSI) based architecture which will support forward and back projection for a 3-dimensional image detected by a multi-ring PET scanner. A selected number of processing engines (20) are included for forward projection and back projection, the number of engines (20) being inversely proportional to the projection time.

10 Claims, 4 Drawing Sheets

DESIGN OF SUPER-FAST THREE-DIMENSIONAL PROJECTION SYSTEM FOR POSITRON EMISSION TOMOGRAPHY

DESCRIPTION

1. Technical Field

The device of the present invention relates to systems for processing image data elements from Positron Emission Tomography (PET) cameras in general and more particularly concerns a device for reducing the time involved in creating an improved resolution, three-dimensional back-projection display from a plurality of image data elements generated by a PET camera.

2. Background Art

Active research is continually being conducted in the area of three-dimensional data collection and reconstruction of positron emission tomography (PET) in order to achieve much needed improvements in image resolution, as well a substantial decrease in the time required to process such PET data into displayed images. 3-D images created by the data from PET scanners having multiple rings of detectors have, in the past, more typically been formed by stacking several 2-D images together since hours of computational time, even on general purpose computers capable of several million instructions per second, are required to produce a single image using extant 3-D reconstruction algorithms (as compared to a few minutes for the stacked case using special 2-D back projection hardware).

A standard multi-ring PET camera with septa is based on the 2-D imaging approach The septa reduce random and scattered coincidences. However, the septa also eliminate coincidence lines-of-response between pairs of detectors more than one ring apart, hence reducing the sensitivity of commercially feasible PET cameras. An eight-ring PET camera with septa will collect data along twenty-two slices. These slices include eight direct planes and fourteen cross slices obtained from adjacent rings. The fourteen cross slices are stored as seven sinograms, each of the seven sinograms being a combination of the cross slices obtained. For example, the line-of-response (LOR) between detector A ring 1 (A-1) and detector B ring 2 (B-2) is summed with the LOR between A-2 and B-1. Thus, fifteen sinograms are stored for use in projecting a 2-D image. The same PET camera with the septa removed or retracted will produce 64 (8×8) sinograms. Similarly, a sixteen-ring PET camera will produce 31 sinograms with septa and 256 (16×16) sinograms with septa removed.

As can be seen, with the septa in place, photon paths which do not lie in the transaxial plane of a single ring or the transaxial plane of two adjacent rings are typically eliminated. For fully effective volume imaging, these photon paths must be included, therefore it is necessary for appropriate tomograph design and a fully 3-dimensional reconstruction algorithm. Included in a 3-D reconstruction must be correction for increased scatter, singles rates and deadtime due to septa removal.

With a modern PET camera, it is possible to produce data for as many as 15 images every few seconds for the first few minutes of a dynamic study. A typical five minute scan can easily produce 240 2-D images. Presently available commercial hardware, which takes 10 seconds to back-project a single 2-D image, would therefore require at least 40 minutes (10 s/image×240 images×1/60 m/s=40 m) to back-project a five minute study. Thus, the time delay for image reconstruction becomes a major impediment to the use of back-projected 3-D PET displays within a clinical environment, even when 3-D images are produced by 2-D stacking.

Some of the prior endeavors in this field are described in the following papers: "Image Reconstruction in Pipeline Architectures," E.B. Hinkle, J.L.C. Sanz, and A.K. Jain; "Proposal for Funding of Research and Development Activities Related to a Radon Transform Computer," A. Jain and W. Current; "Proposal for the Continued Funding of Research on Real-Time Digital Signal Processing Hardware Designs —Phase IV," K.W. Current, A.K. Jain; "A VLSI Implementation of PPPE for Real-Time Image Processing in Radon Space— Work in Progress," W.B. Baringer, B.C. Richards, R.W. Brodersen, J. Sanz, D. Petkovic; "Radon -Based Image Processing in a Parallel Pipeline Architecture," E.B. Hinkle, J.L.C. Sanz, A.K. Jain, *SPIE Advanced Algorithms and Architectures for Signal Processing* (1986), Vol. 696, pp. 140-145; "Computing Projections of Digital Images in Image Processing Pipeline Architectures," J.L.C. Sanz, E.B. Hinkle; "Three-Dimensional Reconstruction of PET Data from a Multi-Ring Camera," D.W. Townsend, T. Spinks, T. Jones, A. Geissbuhler, M. Defrise, M.C. Gilardi, and J. Heather; and "Positron Emission Tomographic Images and Expectation Maximization: A VLSI Architecture for Multiple Iterations Per Second," W.F. Jones, L.G. Byars, M.E. Casey. Copies of these papers are being supplied with this application.

That there has been a plethora of study and research done in this area is represented by the above referenced papers, which are only a sampling of such work, illustrating that the need for the present invention is of long standing and much importance, with many inventors trying to accomplish what the present applicants have finally succeeded in doing.

The device of the present invention embodies a preferred hardware architecture method of supporting 3-dimensional reconstruction and back-projection of the image data elements received from a PET scanning device. The bulk of the computations in most known 3-D algorithms service forward and/or back projection. Likewise, the herein described approach to rapid 3-D projection principally addresses back projection but leaves forward projection well supported, as well.

The architecture of the device of the present invention is designed to principally support parallel beam back projection. "Parallel beam" refers to an ordering of the projection array in which projections are grouped according to their angle of incidence. This type of back projection is compatible with most circular geometry PET systems and contrasts with an alternate technique called fan beam back projection. "Fan beam" refers to an ordering of the projection array in which projections are grouped according to a common intersection with the ring of detectors. Although applicable to PET, fan beam back projection is more generally used with X-Ray CT scanners. In circular geometry PET, parallel beam back projection is favored over fan beam. Fewer computations and smaller projection arrays are required. Roughly comparable image quality is achieved with either approach Development of the architecture of the device of the present invention has been influenced in part by experience with other hardware approaches to reconstruction through the use of general purpose array processors (such as the CDA MSP 3000) and hybrid array processors with special back projection hardware (such as the Analogic XAP). Some current scanners use the XAP as a reconstruction device. Throughput of one completed image every 10 to 20 seconds can be achieved with the XAP. Principal bottlenecks for this system are the back projection time and the movement of data into and out of the XAP.

A recognition of such bottlenecks in practical systems has led to the hardware reconstruction architecture of the device of the present invention. It has been determined that a systolic array approach to back projection provides a flexible solution in which faster back projection simply requires the addition of hardware. The use of a multiport approach to data input and output overcomes many computer bus bandwidth limitations by allowing multiple independent, parallel data paths.

Therefore, it is specifically an object of the present invention to provide an electronic device, preferably formed on a single VLSI chip, comprised of a plurality of data processing circuits to perform rapid sorting, orientation, and modification of a plurality of image data elements from a PET device into pixels for three-dimensional back projection display.

DISCLOSURE OF THE INVENTION

In accordance with various features of the present invention, a 3-dimensional projection system for the rapid back projection or forward projection of multi-ring Positron Emission Tomography (PET) scan data composed of planes of two-dimensional data defining individual Lines Of Response (LOR) into a plurality of image voxels, or volume elements, for three-dimensional display on a video screen is provided. The projection system of the preferred embodiment is a Very Large Scale Integration (VLSI) based architecture which will support forward and back projection for a 3-dimensional image detected by a multi-ring PET scanner. A selected number of processing engines are included for forward projection and back projection, the number of engines being inversely proportional to the projection time. Each VLSI chip performs 3-dimensional coordinate transformation and bilinear interpolation through the use of multipliers, adders, multiplexers, latches, and register blocks. Each VLSI chip accesses two memories such that as a set of data is being processed, a second set of data is being loaded. When both of these events have been accomplished, a controller swaps the access of the VLSI chip. Also at that time, a Dual DMA Controller ends the sending and receiving of one set of data and begins the next. The projection engines are arranged in a systolic array to cooperate in a parallel pipelining environment thus to accommodate simultaneous processing of multiple sets of data and greatly reducing back and forward projection times.

BRIEF DESCRIPTION OF THE DRAWINGS

Other objects and advantages of the present invention will become apparent upon reading the detailed description, together with the following drawings, in which.

BEST MODE FOR CARRYING OUT THE INVENTION

Figure 1:
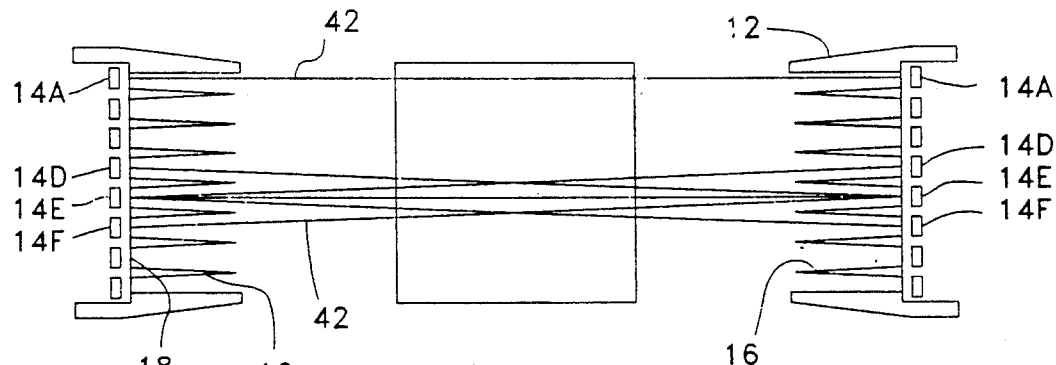
FIG. 1 illustrates the opposing sets of detectors of a multi-ring PET scanning device with septa in place.
Figure 2:
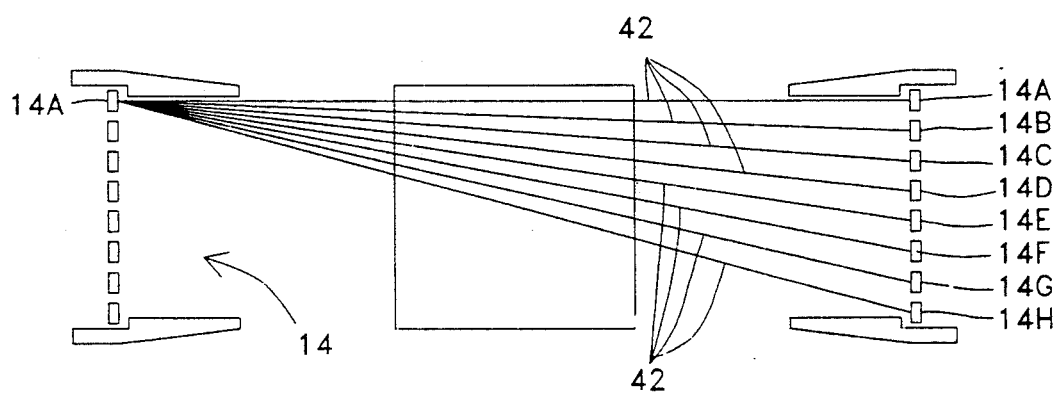
FIG. 2 illustrates the opposing sets of detectors of a multi-ring PET scanning device with septa removed.

A 3-dimensional projection system for positron emission tomography (PET) is indicated in the figures generally at 10. A typical multi-ring PET camera includes septa 16 extending from the interior wall 18 of the detecting cylinder 12, the septa 16 being removable or retractable. The septa 16 act to reduce random and scattered coincidences of emitted photons between pairs of detector rings 14. The septa 16 also eliminate coincidence lines-of-response (LOR's) 42 between pairs of detectors 14 more than one ring apart. The operation of a PET camera without the septa 16 produces a greater amount of LOR's 42 yielding a greater number of true responses, or trues, while also increasing singles, and therefore deadtime and randoms rate, and in the scattered coincidences. In order to reconstruct all data collected from a PET camera with septa 16 removed, 3-dimensional reconstruction algorithms are necessary. Also required are normalization, attenuation correction, deadtime correction, and scatter fraction measurements. These corrections may be made by methods known in the art.

Each sinogram is acquired through valid coincidence signals which are passed from the coincidence processors to the real-time sorter (RTS). The RTS is used to sort, in real time, the LOR's into their correct positions in the appropriate sinogram, each sinogram consisting of a set of parallel LOR's 42. With the septa 16 removed, the number of sinograms attained will equal the square of the number of detector rings 14. Storage of the sinograms is achieved by a straightforward reconfiguration of the RTS memory in order to map the LOR's 42 into the correct storage positions.

A 3-dimensional reconstruction algorithm is necessary for the back projection of the stored sinograms into a 3-dimensional data matrix to represent the image. Many variations on this algorithm are currently under investigation. All involve back projection and filtering. Some algorithms involve forward projection. In most if not all of these popular approaches to 3-dimensional reconstruction, the vast majority of the calculations lie with the forward and back projection phases. The computational burden required by the filtering is typically far less severe. Since filtering is a common requirement, there are many currently available hardware solutions to rapid filter calculations. Speed of filtering with these solutions is adequate for 3-dimensional PET. The requirements for rapid 3-dimensional forward and back projection calculations, however, have so far not been supported by available hardware solutions.

Figure 8:
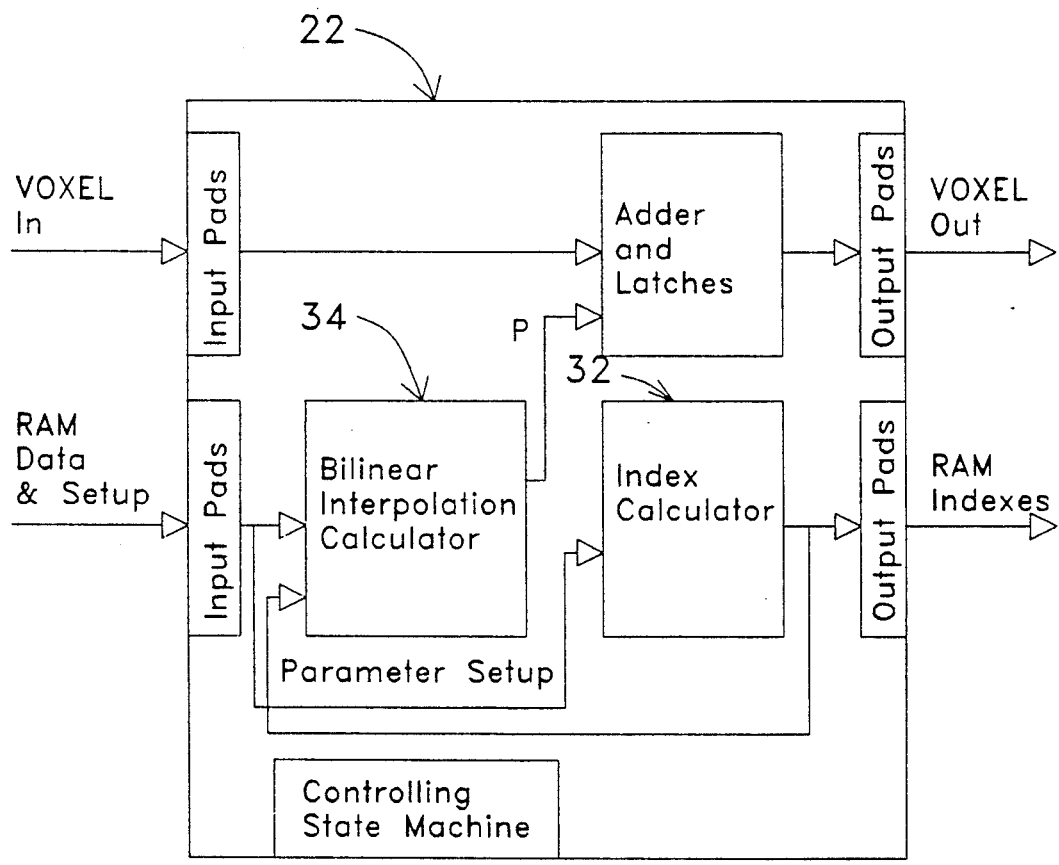
FIG. 8 is a block diagram of the VLSI 3-dimensional projector chip of the present invention.

The preferred embodiment of the present invention is a Very Large Scale Integration (VLSI) based architecture as shown generally in the block diagram of FIG. 8, which will support forward and back projection for a 3-dimensional image comprised of 128×128×32 voxels, V, and 4096 2-dimensional views 44, each 2-D view 44 being comprised of 192×32 LOR's 42. A selected number of processing engines 20 are included, the number of engines 20 being inversely proportional to the projection time, i.e. the processing time is halved as the number of engines 20 is doubled.

The 3-D reconstruction algorithm employed in the present invention is voxel driven, thus parallel LOR's 42 are organized into planes of 2-D views 44. Each 2-D view 44 is defined by a plane with axes t and u and is considered to be normal to the corresponding set of LOR 42. The 3-D volume 46 is defined by axes x, y, and z and is accessed in a sequential fashion in the back projection process.

For each voxel, V, a computation adds to the voxel value the projection contribution from each 2-D view 44. The steps required in the computation include:
1) calculating the index into the 2-D view 44 with a coordinate transformation,
2) performing a bilinear interpolation on the 4 LOR count values nearest the intersection point P, and
3) adding the result to the current voxel value.

Figure 3:
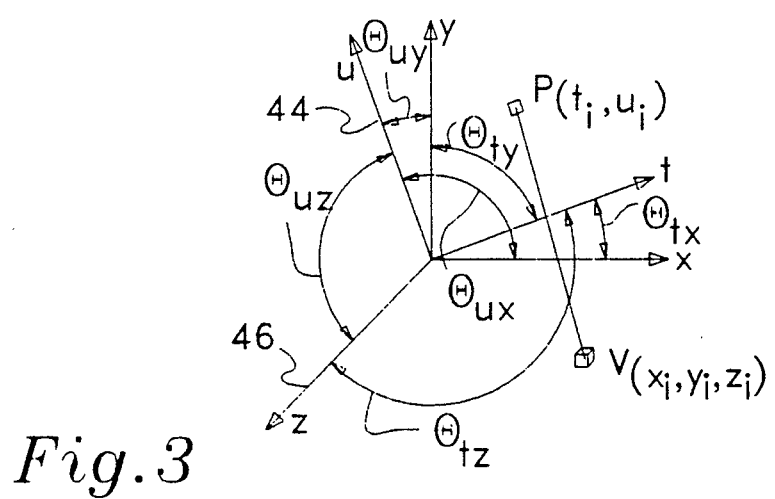
FIG. 3 illustrates a Line of Response (LOR) projecting between a voxel in 3-dimensional space to a projection point in a 2-dimensional view.

FIG. 3 illustrates the coordinate transformation required to project from any point in the 3-D volume 46 to any point in a 2-D plane 44. In order to determine the contribution to a selected voxel V from a selected 2-D plane 44, a line is drawn parallel to the LOR 42 and passes through the center of the selected voxel V. The point of intersection of this line with the 2-D view 44 indicates the specific LOR counts to be applied to the current voxel V. Six angles are important to the calculation involved, those being the angles measured between each of axes x, y, and z, and each of axes t and u [$\theta_{tx}$, $\theta_{ty}$, $\theta_{tz}$, $\theta_{ux}$, $\theta_{uy}$, and $\theta_{uz}$, respectively].

In order to produce the indices into the 2-D plane 44 with axes $t_i$ and $u_i$, given a position in the 3-D volume 46 with axes $x_i$, $y_i$, and $z_i$, the following equations are employed:

$$t_i = x_i d_{tx} + y_i d_{ty} + z_i d_{tz}$$

$$u_i = x_i d_{ux} + y_i d_{uy} + z_i d_{uz}$$

where $d_{tx}$ generically denotes the direction cosine of the angle defined by axes t and x, and $d_{ab}$ similarly denotes the cosine defined by the other five pairs of axes.

Using known techniques for 2-D back projection, this trigonometric computation may be simplified to a series of additions. For any specific voxel, $v_i$, the reference is $x_i$, $y_i$, and $Z_i$. The associated $t_i$ and $u_i$ may be computed as described above. With a voxel spacing equal to unity, or 1, a move to an adjacent voxel, $v_j$, in the x, y, or z direction produces $t_j$ and $u_j$. The difference between $t_i$ and $t_j$ is one of the 3 direction cosine values. Since only one direction is travelled in, the difference in the remaining two directions equals zero. Similarly, the difference between $u_i$ and $u_j$ is equal to one of the three direction cosines. Thus the following equations are obtained:

| direction: | |
|---|---|
| x | $t_j = t_i + d_{tx}$ |
|   | $u_j = u_i + d_{ux}$ |
| y | $t_j = t_i + d_{ty}$ |
|   | $u_j = u_i + d_{uy}$ |
| z | $t_j = t_i + d_{tz}$ |

-continued

| direction: | |
|---|---|
|   | $u_j = u_i + d_{uz}$ |

Figure 4:
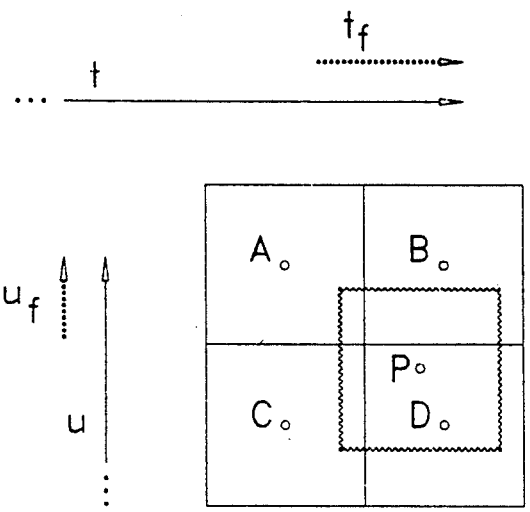
FIG. 4 illustrates the intersection of a projection point with a 2-dimensional view.

FIG. 4 shows a discrete 2-D space referenced by a real index. Point P corresponds to the point of intersection with the 2-D plane 44 from FIG. 3. The value P is a 2-D interpolation of the four nearest LOR count values A, B, C, and D. Vectors t and u represent the real indices into the discrete 2-D projection matrix while $t_f$ and $u_f$ are the fractional components of t and u, respectively.

P may be determined by bilinear interpolation from the 4 LOR count values and the fractional components of the two indices by the following:

$$P = C + t_f(D-C) + u_f(A-C) + t_f u_f(B+C-A-D)$$

Figure 5:
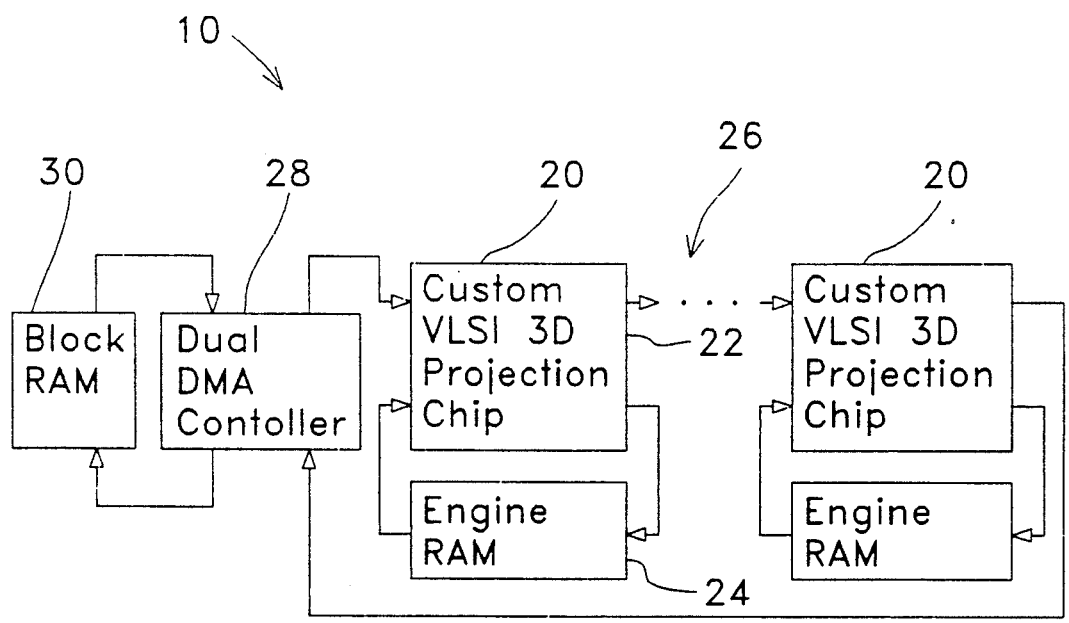
FIG. 5 is a schematic illustration of the 3-dimensional projector architecture of the present invention.

Each projection engine 20 is a VLSI 3-D projection chip 22 with Engine RAM 24. Referring to FIG. 5, a plurality of projection engines 20 are combined to form a systolic array 26. A Dual DMA (Direct Memory Access) Controller 28 moves data from the Block RAM 30 into the systolic array 26 while storing the systolic array 26 output back into the Block RAM 30. Each engine 20 includes an Engine RAM Index Calculator 32 as shown in FIG. 6 and a Bilinear Interpolation Calculator 34 as shown in FIG. 7 and performs the functions of:
1) computing the P value from the 4 values accessed from the Engine RAM 24,
2) adding P to the incoming data from the Block RAM 30, and
3) passing the result on to the next engine 20.

For back projection, the 3-D matrix composed of the complete set of voxels resides in the Block RAM 30. 2-D view data resides in the Engine RAM 24 with one active 2-D view 44 per engine 20, an additional 2-D view 44 being simultaneously loaded. For forward projection, the Engine RAM 24 stores 2-D planes 44 of voxels V, one active 2-D plane 44 per engine 20, and the Block RAM 30 stores a)1 of the 2-D views 44. As discussed above, a larger number of engines 20 provided reduces the time required for back and forward projection.

Figure 6:
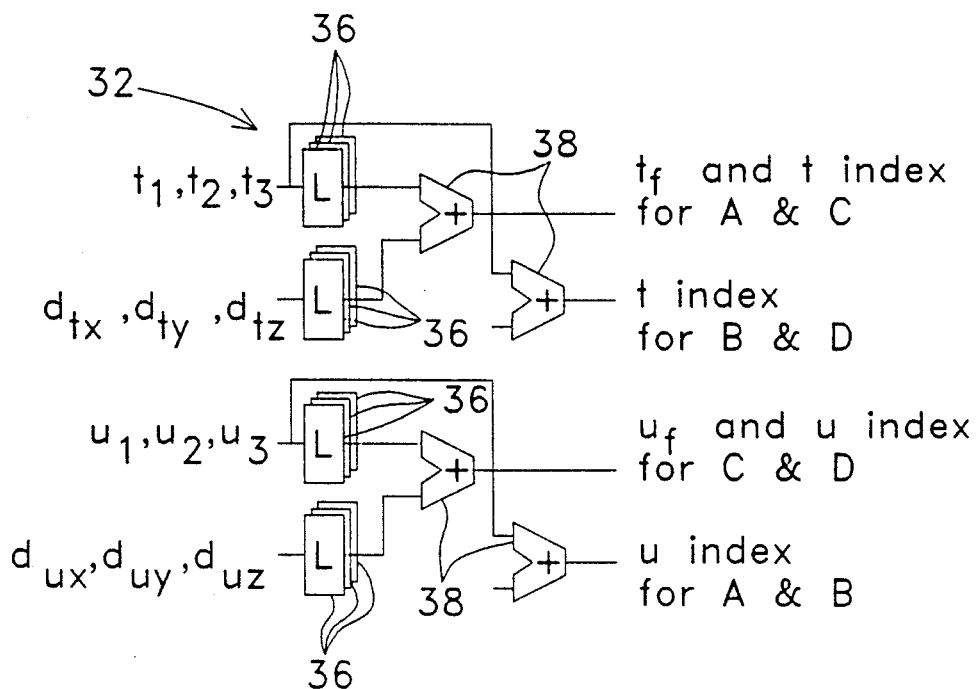
FIG. 6 is a schematic flow diagram of the Engine RAM Index Calculator of the VLSI 3-dimensional projector chip.
Figure 7:
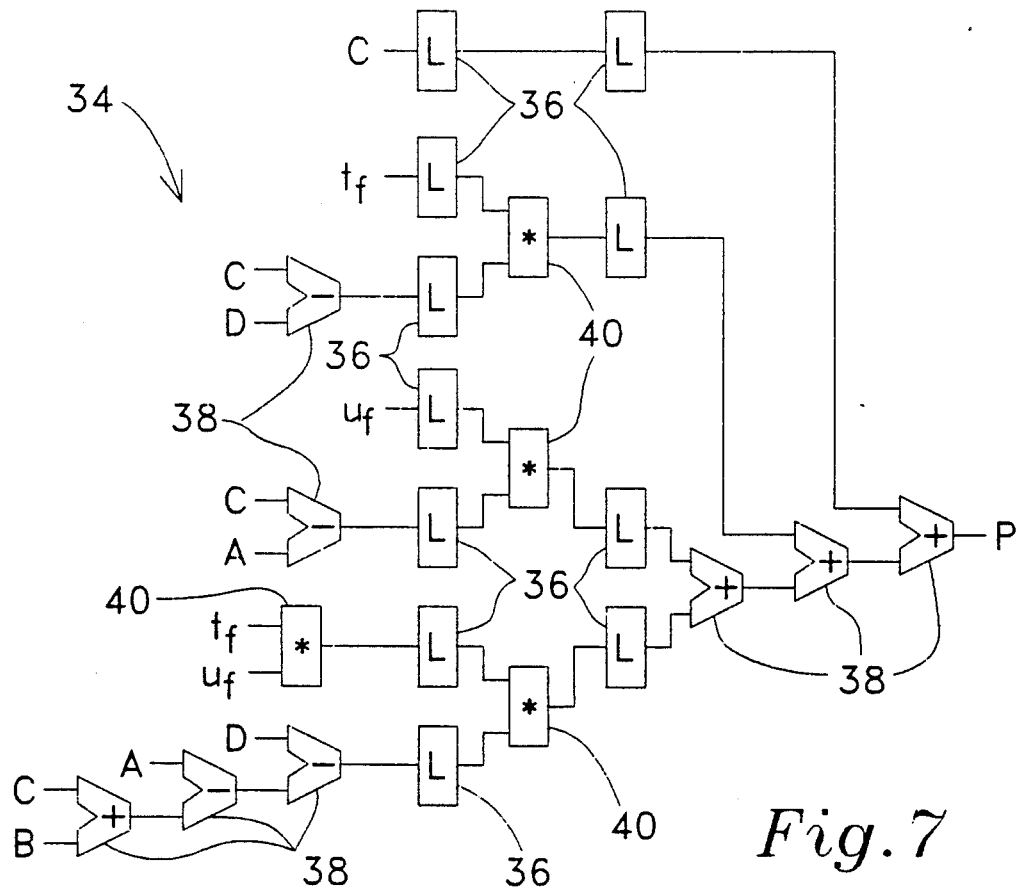
FIG. 7 is a schematic flow diagram of the Bilinear Interpolation Calculator of the VLSI 3-dimensional projector chip.

Referring now to FIG. 6, a schematic for an Engine RAM Index Calculator 32 is shown. The Index Calculator 32 computes the t and u indices into the projection plane. Precalculated values for t and u and the 6 direction cosines, $d_{ab}$, are loaded into latches 36. Two adders 38 are provided to perform $[t_j = t_i + d_{tx}]$ and $[u_j = u_i + d_{ux}]$ for each of the three directions, t and u being modified simultaneously. Outputs from the circuit supply the Engine RAM 24 addresses and the fractional components $t_f$ and $u_f$, the Engine RAM 24 addresses, t and u, having the fractional content set to zero and also these values plus 1.

Six latches 36 are used for storing t and u, three latches 36 each being used to store the initial values of t and u, respectively. These latches 36 will be referred to as $t_1$, $t_2$, $t_3$, $u_1$, $u_2$, and $u_3$. The latches $t_1$ and u serve as the working registers, with $t_2$, $t_3$, $u_2$, and $u_3$ being used to save the initial t and u values at the edges of the 3-D matrix. For back projection, as each new voxel value arrives at the engine 20, $t_1$ is modified with the correct $d_{ab}$ value, depending on the direction of the new voxel, $v_{i+1}$, with respect to the previous voxel $v_i$. When the end of a row of voxels is reached, the next voxel V to be used will be the first voxel V in the next row. The working registers, $t_1$ and $u_1$, are now set equal to $t_2$ and $u_2$, respectively, plus the corresponding $d_{ab}$ for a row to row step. Also at this time, $t_2$ and $u_2$ are set equal to the new $t_1$ and $u_1$ values, respectively. This procedure is repeated until each row in the plane has been processed. The next voxel to be processed is then the first voxel in the first row of the second plane. The working registers, $t_1$ and $u_1$, are set equal to $t_3$ and $u_3$, respectively, plus the corresponding $d_{ab}$ for a plane to plane step. At this time, both $t_2$ and $t_3$, and both $u_2$ and $u_3$ are set equal to the new $t_1$ and $u_1$ values, respectively. Again, this process is repeated until all planes have been processed.

FIG. 7 illustrates the schematics of a Bilinear Interpolation Calculator 34 of the preferred embodiment. Output from the Engine RAM Index Calculator 32 is input into the Bilinear Interpolation Calculator 34. This input includes the four LOR values of A, B, C, and D, and the two index fractional components $t_f$ and $u_f$. The value of P is determined according to the equation:

$$P = C + t_f(D-C) + u_f(A-C) + t_f u_f(B+C-A-D)$$

as explained above. This operation is carried out by the use of adders 38, multipliers 40, and latches 36. It will be seen from FIG. 7 that the initial operations include the summation of B and C; the multiplication of $t_f$ and $u_f$; the reduction of A by the value of C; the input of $u_f$; the reduction of D by the value of C; the input of $r_f$; and the input of C. The sum of B and C is then reduced by the values of A and D, this total being stored in a latch 36 and then multiplied by the $t_f u_f$ product which has been stored in a latch 36. The product of $t_f u_f(B+C-A-D)$ is stored in a latch 36. The A minus C sum is likewise stored in a latch 36 and then multiplied by $u_f$, the product being stored in a latch 36 and then added to the $t_f u_f(B+C-A-D)$ product. The D minus C sum is stored in a latch 36 and then multiplied by the index fractional component $t_f$, stored in a latch 36 and then added to the $u_f(A-C) + t_f u_f(B+C-A-D)$ sum. The value of C is then added to this summation to obtain the output value of P.

The time required for a back projection may be determined by:

$$B = V_x * V_w * T/N$$

where:
B = time to perform back projection;
$V_x$ = number of voxels in the 3-D matrix 46;
$V_w$ = number of 2-D views 44;
T = time to cycle one voxel V; and
N = the number of engines 20.

With state-of-the-art CMOS gate array propagation, the time required to cycle one voxel V is less than 200 ns, such that for a tomograph with 16 rings 14 each having 512 crystals, and a 16-engine projection machine, the back projection time, B, is equal to 27 seconds. This time is significantly reduced from the four to eight hours required with other available algorithms performed on other available architectures.

The time required for forward projection may be computed by:

$$F = S * E * V_w * T/N$$

where:
F = time to perform forward projection;
S = number of 2-D slices in the 3-D projection;
E = number of LOR count values per 2-D view 44;
$V_w$ = number of 2-D views 44;
T = time to cycle one LOR count value; and
N = number of engines 20.

Thus for the same tomograph above, the time required for forward projection is 40 seconds.

The times calculated for back and forward projection are based on several design criteria. These include:
1) chip speed $\leq$ 200 ns/cycle
2) computational precision for $t_f$ and $u_f$ = 8 to 10 bits
3) Complimentary Metal-Oxide Semiconductor (CMOS) transistor feature size = 1.5 to 2 micron.

Although the transistor count is dependent on the computational precision required, approximately 45,000 transistors are required on each VLSI chip 22 in order to insure feasibility.

Thus, from the foregoing detailed description, it will be recognized that a 3-dimensional projection system for positron emission tomography (PET) has been provided. The projection system of the preferred embodiment is a Very Large Scale Integration (VLSI) based architecture which will support forward and back projection for a 3-dimensional image detected by a multi-ring PET scanner. A selected number of processing engines are included for forward projection and back projection, the number of engines being inversely proportional to the projection time, i.e. the processing time is halved as the number of engines is doubled.

While a preferred embodiment of a device constructed in accordance with various features of the present invention has been described herein, no attempt has been made to limit the device to such description. Rather, such description has been intended to embody all possible variations and alternate constructions falling within the spirit and scope of the invention as defined in the appended claims.

Accordingly, this invention is limited only by the claims appended hereto, and their equivalents, when taken in combination with the complete description contained herein.

Having thus described the aforementioned invention, I claim:

1. An architecture for rapid 3-dimensional reconstruction of data collected from positron emission tomography (PET) scanners, said architecture being capable of selective back and forward projection, and said architecture comprising:

a memory means for storing a 3-dimensional matrix to be imaged through back projection and for storing a complete set of two-dimensional views obtained through forward projection;

a plurality of projection engines, each of said plurality of projection engines being used for storing a single two-dimensional view to be back projected and for storing a single two-dimensional plane of voxels from said three-dimensional matrix to be forward projected, each of said plurality of projection engines including a group of at least one Very Large Scale Integration (VLSI) chip and an engine memory, each of said VLSI chips being used for said back projection and said forward projection of said data, said engine memory being used for storage of data to be projected, each of said VLSI chips including an engine memory index calculator for computing a 3-dimensional coordinate transformation for projecting any point in said 3-dimensional volume to any point in said 2-dimensional projection plane and a bilinear interpolation calculator for computing a value P of a point of intersection of an LOR with said projection plane, said 3-dimensional coordinate transformation producing indices $t_i$ and $u_i$ of any position in said 3-dimensional volume into said 2-dimensional plane where $$t_i = x_i d_{tx} + y_i d_{ty} + z_i d_{tz};$$

and $$u_i = x_i d_{ux} + y_i d_{uy} + z_i d_{uz}$$

and where $X_i$, $y_i$, and $z_i$ represent the coordinates of said point in said 3-dimensional volume, and $d_{tx}$, $d_{ty}$, and $d_{tz}$ represent the cosines of angles defined between a t-axis of said 2-dimensional plane and x-, y-, and z-axes of said 3-dimensional volume, respectively, and $d_{ux}$, $d_{uy}$, and $d_{uz}$ represent the cosines of the angles between a u-axis of said 2-dimensional plane and said x-, y-, and z-axes of said 3-dimensional volume, respectively; and a dual controller for exchanging data between said memory means and a systolic array of multiple projection engines.

2. The architecture for rapid 3-dimensional reconstruction of data collected from PET scanners of claim 1 wherein said memory means is block random access memory (block RAM).

3. The architecture for rapid 3-dimensional reconstruction of data collected from PET scanners of claim 1 wherein said dual controller is a dual direct memory access (DMA) controller.

4. The architecture for rapid 3-dimensional reconstruction of data collected from PET scanners of claim 1 wherein said projection engines form a systolic array to accommodate parallel pipelining of data.

5. The architecture for rapid 3-dimensional reconstruction of data collected from PET scanners of claim 1 wherein said 3dimensional coordinate transformation equations are reduced to addition operations for unitary steps between voxels, said reduced equations being defined as:

$t_j = t_i + d_{tx}$; and $u_j = u_i + d_{ux}$ for progression in said x-direction;

$t_j = t_i + d_{ty}$; and $u_j = u_i + d_{uy}$ for progression in said y-direction; and $t_j = t_i + d_{tz}$; and $u_j = u_i + d_{uz}$ for progression in said z-direction, $t_i$ and $u_i$ being defined as the indices for a selected voxel $v_i$, and $t_j$ and $u_j$ being defined as the indices for a voxel $v_j$ adjacent to voxel $v_i$ with voxel spacing equal to 1.

6. The architecture for rapid 3-dimensional reconstruction of data collected from PET scanners of claim 1 wherein said bilinear interpolation calculator determines said value P by bilinear interpolation from the four nearest Line of Response (LOR) count values and said 2-dimensional indices acquired from said engine RAM index calculator using the equation, and any algebraic derivations thereof:

$$P = C + t_f(D-C) + u_f(A-C) + t_f u_f(B+C-A-D),\ t_f$$

and $u_f$ being said fractional components of t and u, respectively, and A, B, C, and D being the respective values of said four nearest LOR count values.

7. The architecture for rapid 3-dimensional reconstruction of data collected from PET scanners of claim 1 wherein each of said groups of VLSI chips is provided with at least a plurality of multipliers, adders, multiplexers, and register blocks for performing mathematical calculations on view data passed through said engine RAM index calculator and said bilinear interpolation calculator.

8. An architecture for rapid 3-dimensional reconstruction of data collected from PET scanners, said reconstruction of tomographic images being supported by an electronics board having an architecture capable of selective back and forward projection, and said board comprising:

a plurality of I/O ports to allow for rapid and simultaneous data flow;

a block RAM for the storage of a 3-dimensional matrix to be imaged through back projection and for the storage of a complete set of two-dimensional views obtained through forward projection;

a plurality of projection engines, each of said projection engines being used for the storage of a single two-dimensional view to be back projected and for the storage of a single two-dimensional plane of voxels from said three-dimensional matrix to be forward projected, said projection engines forming a systolic array to accommodate parallel pipelining of data, each of said projection engines including a group of at least one VLSI chip and an engine RAM, each of said VLSI chips being used for the back projection and forward projection of said data, and said engine RAM for the storage of data to be projected, each of said groups of VLSI chips including an engine RAM index calculator for computing a 3-dimensional coordinate transformation for projecting any point in said 3-dimensional volume to any point in said 2-dimensional projection plane and a bilinear interpolation calculator for computing the value P of the point of intersection of said LOR with said projection plane, said 3-dimensional coordinate transformation using the simplified equations:

$t_j = t_i + d_{tx}$; and $u_j = u_i + d_{ux}$ for progression in said x-direction;

$t_j = t_i + d_{ty}$; and $u_j = u_i + d_{uy}$ for progression in said y-direction; and $t_j = t_i + d_{tz}$; and $u_j = u_i + d_{uz}$ for progression in said z-direction, $t_i$ and $u_i$ being defined as the indices for a selected voxel $v_i$, $t_j$ and $u_j$ being defined as the indices for a voxel $v_j$ adjacent to voxel vi with voxel spacing equal to 1, and $d_{tx}$, $d_{ty}$, $d_{tz}$, $d_{ux}$, $d_{uy}$, and $d_{uz}$ representing the cosine of the angles between the t axis of said 2-dimensional plane and the x, y, and z axes of said 3-dimensional volume, and the cosine of the angles between the u axis of said 2-dimensional plane and said x, y, and z axes of said 3-dimensional volume, respectively, said bilinear interpolation calculator determining said value P by bilinear interpolation from the four nearest Line of Response (LOR) count values and said 2-dimensional indices acquired from said engine RAM index calculator using the equation, and any algebraic derivations thereof:

$$P = C + t_f(D-C) + u_f(A-C) + t_f u_f(B+C-A-D),\ t_f$$

and $u_f$ being said fractional components of t and u, respectively, and A, B, C, and D being the respective values of said four nearest LOR count values for back projection and voxel values for forward projections, and each of said groups of VLSI chips including at least a plurality of multipliers, adders, multiplexers, and register blocks for performing mathematical calculations on view and voxel data passed through said engine RAM index calculator and said bilinear interpolation calculator; and a dual DMA controller for exchanging data between said block RAM and a systolic array of multiple projection engines.

9. The architecture for rapid 3-dimensional reconstruction of data collected from PET scanners of claim 8 wherein each of said plurality of projection engines accesses at least two view memories such that a double buffering technique may be used to allow one set of RAM acquired from a set of said parallel LOR's to be accessed by said engine while a second set is loaded for a subsequent pass through an image, said controller swapping said access of said view memories at an end of each of said passes through said image data, said controller then loading a subsequent set of parameters into each engine.

10. The architecture for rapid 3-dimensional reconstruction of data collected from PET scanners of claim 1 wherein said engine memory is random access memory (RAM).

* * * * *

UNITED STATES PATENT AND TRADEMARK OFFICE
CERTIFICATE OF CORRECTION

PATENT NO. : 5,224,037
DATED : June 29, 1993
INVENTOR(S) : William F. Jones, Michael E. Casey, Larry G. Byars It is certified that error appears in the above-identified patent and that said Letters Patent is hereby corrected as shown below:

Column 1, line 32, "approach" should read --approach.--.
Column 2, line 64, "approach" should read --approach.--.
Column 6, line 42, "a)1" should read --all--.
Column 6, line 61, "userve" should read --$u_1$ serve--.
Column 7, line 29, "$r_f$" should read --$t_f$--.
Column 9, line 13, "$X_i$" should read --$x_i$--.
Column 9, line 39, "3dimensional" should read --3-dimensional--.
Column 9, line 60, "$U_f$" should read --$u_f$--.
Column 10, line 46, "vi" should read --$v_i$--.

Signed and Sealed this

Twelfth Day of April, 1994

BRUCE LEHMAN

*Commissioner of Patents and Trademarks*

*Attest:*

*Attesting Officer*